United States Patent
Huang et al.

(10) Patent No.: US 8,725,006 B2
(45) Date of Patent: May 13, 2014

(54) DIGITAL SIGNAL-TO-SIGNAL BEAT NOISE REDUCTION FOR FILTER-LESS COHERENT RECEIVING SYSTEM

(75) Inventors: Yue-Kai Huang, Princeton, NJ (US); Ezra Ip, Princeton, NJ (US); Dayou Qian, Princeton, NJ (US); Philip Ji, Princeton, NJ (US); Yoshiaki Aono, Princeton, NJ (US); Tsutomu Tajima, Princeton, NJ (US)

(73) Assignees: NEC Laboratories America, Inc., Princeton, NJ (US); NEC Corporation (JP)

( * ) Notice: Subject to any disclaimer, the term of this patent is extended or adjusted under 35 U.S.C. 154(b) by 402 days.

(21) Appl. No.: 13/270,210

(22) Filed: Oct. 10, 2011

(65) Prior Publication Data

US 2012/0219294 A1 Aug. 30, 2012

Related U.S. Application Data

(60) Provisional application No. 61/446,762, filed on Feb. 25, 2011.

(51) Int. Cl.
*H04B 10/61* (2013.01)
(52) U.S. Cl.
USPC ............................................. 398/204
(58) Field of Classification Search
USPC .................................. 398/203–207
See application file for complete search history.

(56) References Cited

U.S. PATENT DOCUMENTS

2009/0047030 A1* 2/2009 Hoshida ...................... 398/205
2009/0190929 A1* 7/2009 Khurgin et al. ................ 398/79

FOREIGN PATENT DOCUMENTS

EP 2273701 * 1/2011

OTHER PUBLICATIONS

P. N. Ji, Y. Aono, et al., "Transponder Aggregator without Wavelength Selector for Colorless and Directionless Multi-Degree ROADM Node", NEC Labs TR 2009-L143.

L. E. Nelson, S. L. Woodward and P. D. Magill, "Real-time detection of a 40 Gbps intradyne channel in presence of multiple received WDM channels," Proc. OFC/NFOEC 2010, San Diego, CA, Mar. 21-25, 2010, Paper OMJ1.

L. Kazovsky, "Multichannel coherent optical communications systems," J. Lightw. Technol., vol. 5, No. 8, pp. 1095-1102, Aug. 1987.

T. Pfau, S. Hoffmann, O. Adamczyk, R. Peveling, V. Herath, M. Porrmann, and R. Noe, "Coherent optical communication: towards realtime systems at 40 Gbit/s and beyond," Opt. Exp., vol. 16, No. 2, pp. 866-872, Jan. 2008.

U.S. Appl. No. 12/900,220, Philip Nan Ji.

* cited by examiner

*Primary Examiner* — Leslie Pascal
(74) *Attorney, Agent, or Firm* — Jospeh Kolodka

(57) ABSTRACT

Systems and methods are disclosed for a filter-less coherent receiving system with a filter-less coherent receiver frontend; a signal-signal beat-noise detector coupled to the filter-less coherent receiver frontend; and a real-time processor coupled to the filter-less coherent receiver frontend and the signal-signal beat-noise detector to reject signal-signal interference.

24 Claims, 4 Drawing Sheets

DIGITAL SIGNAL-TO-SIGNAL BEAT NOISE REDUCTION FOR FILTER-LESS COHERENT RECEIVING SYSTEM

The present application claims priority to Provisional Application Ser. No. 61/446,762 filed Feb. 25, 2011, the content of which is incorporated by reference.

BACKGROUND

The application relates to filterless coherent optical receivers.

Coherent optical detection is becoming a mature commercial technology and is revolutionizing optical fiber communications. Amongst the advantages of coherent detection are improved receiver sensitivity, increased spectral efficiency, and digital compensation of channel impairments, which are enabled by recovery of the electric field. The intermarriage of coherent detection with tunable optics is facilitating dynamically tunable transceivers whose operations are defined by control layer software. We recently proposed a colorless and directionless reconfigurable optical add/drop multiplexer (ROADM) architecture that uses coherent receiver, where a local oscillator (LO) laser is tuned near the center frequency of the channel of interest for demodulation, in each transponder among all dropped channels at the node. This architecture does not require wavelength selectors, such as optical demultiplexer or tunable filter array, at the transponder aggregator, and therefore the receiver is called filterless receiver.

The front-end of a coherent receiver is an optical hybrid combining the signal with the LO. After square-law photodetection, the output photocurrent consists of a desired signal-LO beating term plus undesired interferences arising from signal-signal and LO-LO beating. The LO-LO beating is a DC term which can be easily rejected using a DC block. The signal-signal interference however, will occupied the same down-converted bandwidth as the signal-LO beating term and will scale linearly as the number of WDM channels increases. For example, with a typical LO-to-signal (per optical channel) power ratio of 20 dB, the signal-signal interference will reach comparable power as the signal-LO beating term when the number of WDM channel approaches 100. Therefore in the filterless receiver design, one major task is to keep the signal-signal interference term as small as possible so the loss of performance is acceptable.

Signal-signal interference may be suppressed with balanced detection, where a pair of identical photodiodes is illuminated with the signal mixed with opposite phases (180 degree difference) of the LO. The interference, being a common term in the two inputs of the photodiodes regardless of the phase of the LO, can therefore be cancelled after subtracting the output photocurrents. System performance in this case can be improved by increasing the common-mode rejection ratio (CMRR) of the optical front-end, which is determined by factors such as responsivity matching of the photodiodes, power imbalance in the optical hybrid, and timing skews between the two inputs. Replacing single-ended photodiodes with balanced photodiodes could raise the component cost for coherent receivers, while designing CMRR>20 dB also takes extra engineering efforts which may increase system complexity.

Noise and interference reduction can also be achieved by adding redundant signal mixing paths in the coherent receiver. By using 3×3 couplers instead of 90 degree hybrid as the mixing components, one can minimize the influence of noise and interference in coherent detection because of these common terms will be suppressed during the extraction of I and Q components. This approach however will increase implementation cost and complexity because of the additional channels needed for the down-conversion (three channels instead of two in each polarization). It may also require more DSP resources due to the extra steps for I and Q component extraction.

SUMMARY

In one aspect, systems and methods are disclosed for a filter-less coherent receiving system with a filter-less coherent receiver frontend; a signal-signal beat-noise detector coupled to the filter-less coherent receiver frontend; and a real-time processor coupled to the filter-less coherent receiver frontend and the signal-signal beat-noise detector to reject signal-signal interference.

In another aspect, the reduction of signal-signal beat noise interference is achieved by simultaneously detecting the signal-signal beating terms for the filter-less coherent receiver. One additional channel for each polarization, which will have the same photodetector and ADC bandwidth response as one of the regular coherent receiver channels, is dedicated for beat noise detection over the entire WDM signal band. The detected signal-signal beating term, after digital sampling, can then be used to cancel the signal-signal interference presented in the regular coherent receiver channels in real-time using DSP.

In yet another aspect, a method to provide digital signal-to-signal beat noise reduction in a filter-less coherent receiving system includes splitting an incoming wavelength-division multiplexing (WDM) optical signal into two paths provided as inputs to a coherent receiver and a signal-signal interference (SSI) detection receiver, wherein the optical signal has one polarization reference for the coherent receiver and the SSI detection receiver; digitizing four signal components of the coherent receiver; separating the SSI signal into separate SSI X and Y polarization with a polarization beam splitter (PBS) and digitizing the SSI X and Y polarizations; and performing digital SSI suppression by subtracting the SSI X and Y polarizations from the signal components received by the coherent receiver.

Advantages of the preferred embodiment may include one or more of the following. The system provides a signal-signal interference suppression method for the design of the filter-less coherent receiver in WDM systems. By simultaneously detecting the signal-signal beat noise terms for the entire WDM channels and apply proper cancellation in DSP, it will greatly reduce the performance penalty incurred by the increase of the WDM channels presented in the system. The use of single-ended photodiodes in filter-less coherent receiver reduces cost. For a typical polarization multiplexed optical line, the system uses a total of 4 photodiodes, or half of the numbers required for balanced photo-detection. The system requires two additional channels for beat-noise detection. However, since the signal-signal beat-noise will be the same for all the optical lines presented in the WDM system, the detected beat-noise information can be shared among all WDM channels. So the system greatly reduces the component cost as the number of optical lines in one WDM transponders increases, by cutting the number of photodiodes by half at the expense of adding two additional photodiodes and two ADCs. The system also reduces the complexity involved in hardware engineering required to produce high CMRR as in the balanced detection case. Moreover, the system can also be applied to balanced coherent receiver as a mean to improve performance when pure hardware CMRR from balanced detection aren't sufficient for the filter-less application (i.e.

CMRR<20 dB). The foregoing benefits are achieved with a slight increase in DSP complexity due to the additional signal routing and operation needed for interference reduction.

DESCRIPTION

Figure 1:
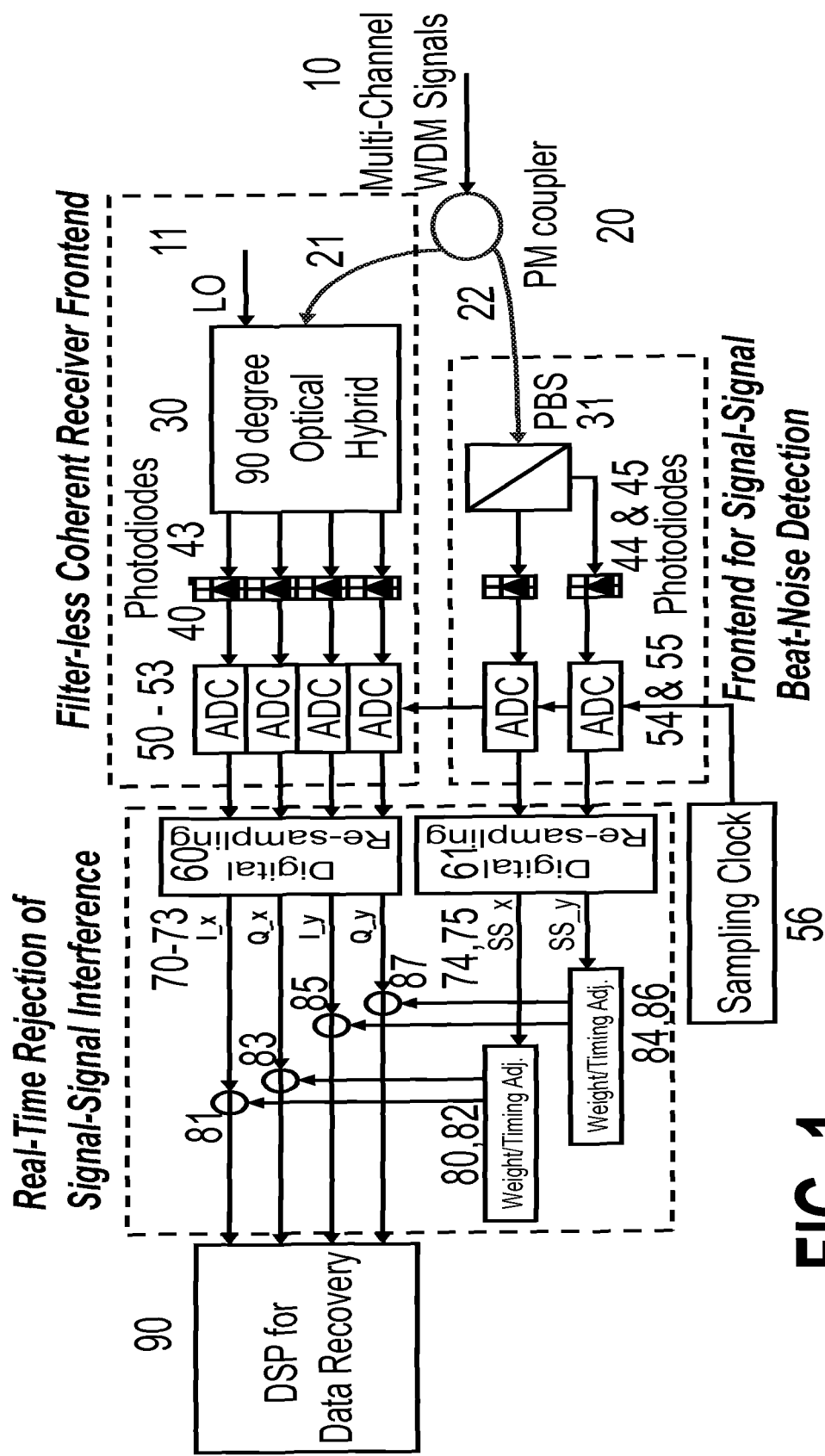
FIG. 1 shows an exemplary filter-less coherent receiver.
Figure 2:
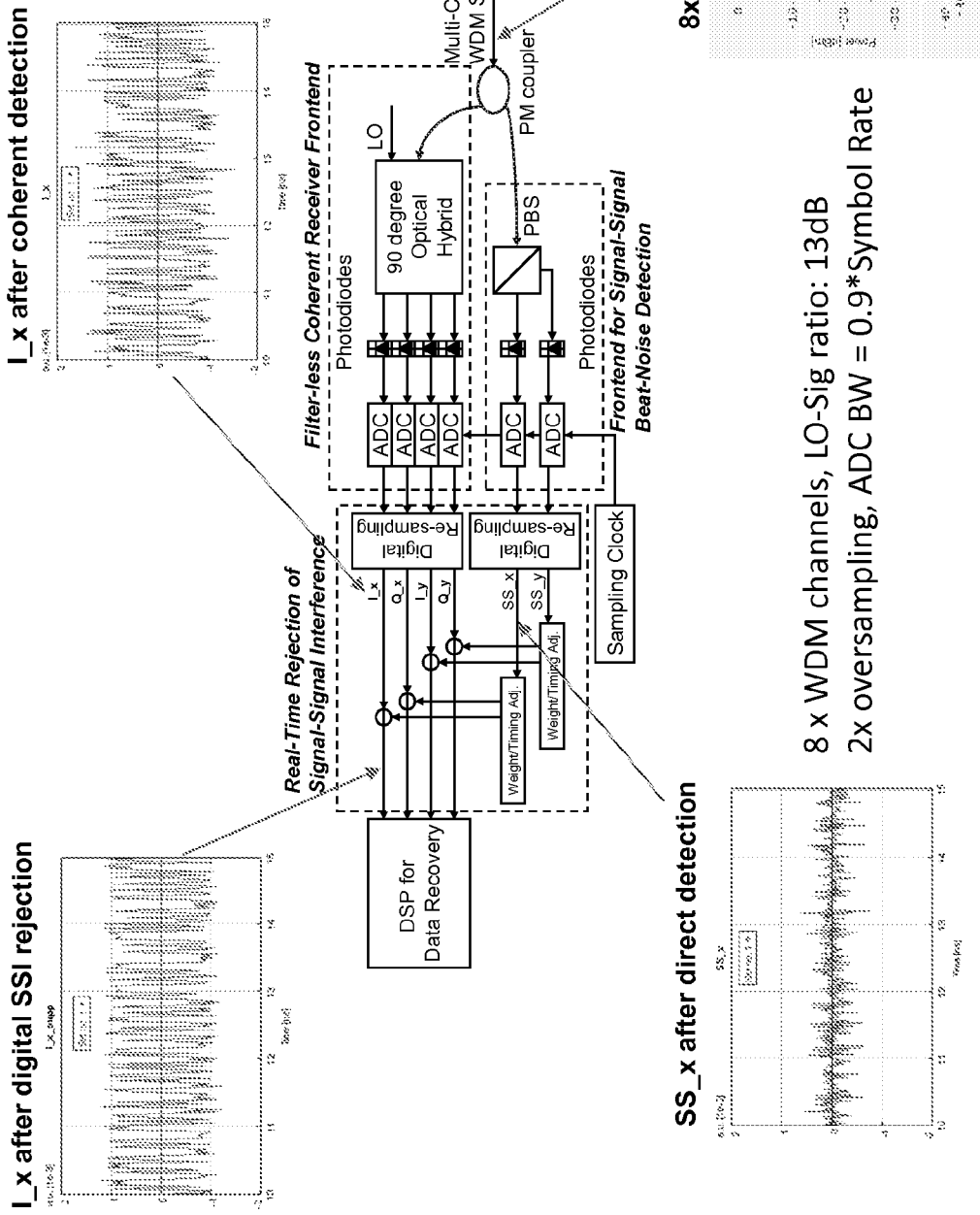
FIG. 2 shows captured signal waveforms generated during simulation.
Figure 3:
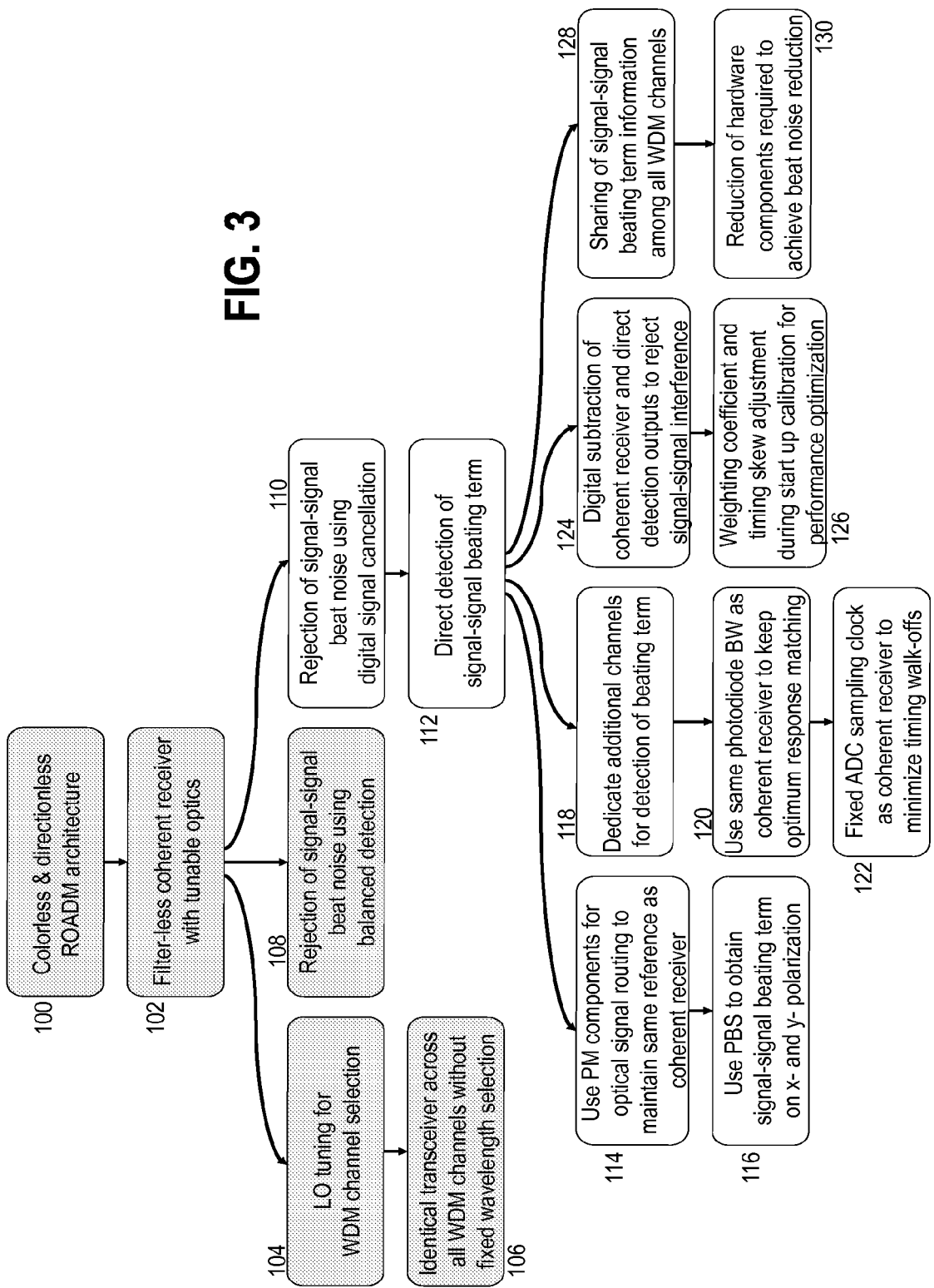
FIG. 3 shows an exemplary process for a filter-less coherent receiver with tunable optics.

FIG. 1 shows an exemplary filter-less coherent receiver that includes a standard coherent receiver frontend, an additional frontend for signal-signal beat-noise detection, and cancellation of signal-signal interference in digital domain. FIG. 2 shows captured signal waveforms generated during simulation. The multiple WDM optical signals (10) are first split using polarization maintaining (PM) coupler (20) and connected to the two different frontend modules via two PM fibers (21,22). The filter-less coherent receiver frontend uses a tunable frequency LO (11) to select one of the WDM channels for O/E down-conversion and A/D conversion using an optical hybrid (30), photodiodes (40-43), and ADCs (50-53). After DC blocking, the down-converted photo current power per quadrature will have a LO-signal beating term and a signal-signal beating term:

$$<I_{coherent}^2> = \frac{1}{2}R^2\frac{P_{ch}}{4}\frac{P_{lo}}{4} + \frac{1}{4}R^2 N_{ch}\left(\frac{P_{ch}}{4}\right)^2\left(\frac{R_s}{f_{sp}}\right)$$

(R: photodiode responsivity; $P_{ch}$: optical power per channel, $P_{LO}$: LO optical power, $N_{ch}$: number of WDM channels, $R_s$: receiver BW, $f_{sp}$: WDM channel spacing)

The frontend of the signal-signal beat-noise detection has a polarization beam splitter (PBS, 31) which allows direct detection and A/D conversion for WDM signals on x- and y-polarizations. The same polarization reference is used as the filter-less coherent receiver, therefore PM components are used for signal splitting and routing to the separate modules. The photodiodes (44 & 45) for direct detection shall have same frequency response as those used in the coherent receiver module, while the ADCs (54 & 55) will share the same sampling clock (56) used in the coherent receiver to ensure optimum response and timing matching after digital sampling between the two modules.

After the digitized signals are re-sampled (60 & 61) to have smaller step-size, the direct detected signal-signal beat-noise SS_x and SS_y (74 & 75) will be used to cancel the interference terms at the outputs of the coherent receiver by digital signal subtraction (81, 83, 85, and 87). The weighting coefficients on SS_x and SS_y and their exact timing relative to I_x, Q_x, I_y, and Q_y (70-73) will be a fixed set of values which can be adjusted and set during system startup calibration. Once the weighting coefficient and timing offset are set, it can be applied to SS_x and SS_y in real-time (80, 82, 84, and 86) to reject the signal-signal interference before the coherently received signals are sent to DSP for data recovery (90).

Since the signal-signal beat-noise term will be the same for each optical line within the WDM system (providing that their reference of polarization is the same at each coherent receiver), the same direct detection module can be used for all the channels within the same WDM systems. One just need to provide proper signal routing across the transponder backplane and separate adjustment of the weighting coefficients and timing skews.

In coherent detection, a local oscillator (LO) laser is tuned near the center frequency of the channel of interest to demodulate the signal to electrical baseband via intradyne detection. The total bandwidth downconverted is given by the photodetector bandwidth, which is typically in the tens of GHz. As the electrical baseband signal can be sampled, and digital signal processing (DSP) algorithms used to extract the channel of interest, coherent detection and DSP removes the need for optical filtering at the receiver. This enables wavelength-division multiplexed (WDM) channels to be packed closer together, since digital filters can be designed with arbitrarily sharp cutoff. In coherent optical orthogonal frequency-division multiplexing (CO-OFDM), frequency sub-channels can in fact overlap while remaining digitally separable. The front-end of a coherent receiver is an optical hybrid combining the signal with the LO. Square-law photodetection follows. The output photo current consists of a desired signal-LO beating term corrupted by interferences arising from signal-signal and LO-LO beating. The interferences may be suppressed with "balanced detection," where a pair of identical photodiodes is illuminated with the signal mixed with opposite phases of the LO. Imprecision in the responsivities of the photodiodes or power imbalance in the optical hybrid reduces interference suppression. As the signal-signal interference scales with the number of WDM channels, the filter-less receiver needs to be carefully designed to ensure the loss of performance is acceptable. The system performance is improved by: (i) increasing the common-mode rejection ratio (CMRR) of the optical front-end, and (ii) increasing the ratio between the power of the LO and the power per WDM channel.

In one embodiment, the flow operation is as follows:
1. Split incoming WDM optical signal into two paths as inputs to the coherent Rx and SSI detection module
   Polarization reference between coherent Rx and SSI Rx must be the same. This can be easily done by using PM couplers and patchcords for signal splitting.
   Note the polarization reference mentioned here is for receiver definition only. It doesn't matter if there is polarization rotation during signal transmission.
2. Same front-end design for coherent Rx.
   Four signal components will be digitized: I_x, Q_x, I_y, Q_y.
3. SSI Rx consists of a PBS to separate the X and Y polarization; two single-end PDs, and two ADCs.
   Two signal components will be digitized: SS_x and SS_y. (SSI on X & Y polarizations)
4. Digital SSI suppression:
   Digital re-sampling is first applied so one can fine-tune the timing offsets.
   SSI can then be subtracted from the four components received by coherent Rx:
   The weighting coefficient $c_{Ix}$ and timing offset $k_{Ix}$, can be measured at beginning. They can also be finely adjusted by performance feedbacks in DSP.
5. After digital SSI suppression, the four signal components can be processed using standard DSP algorithm for data recovery.

Figure 4:
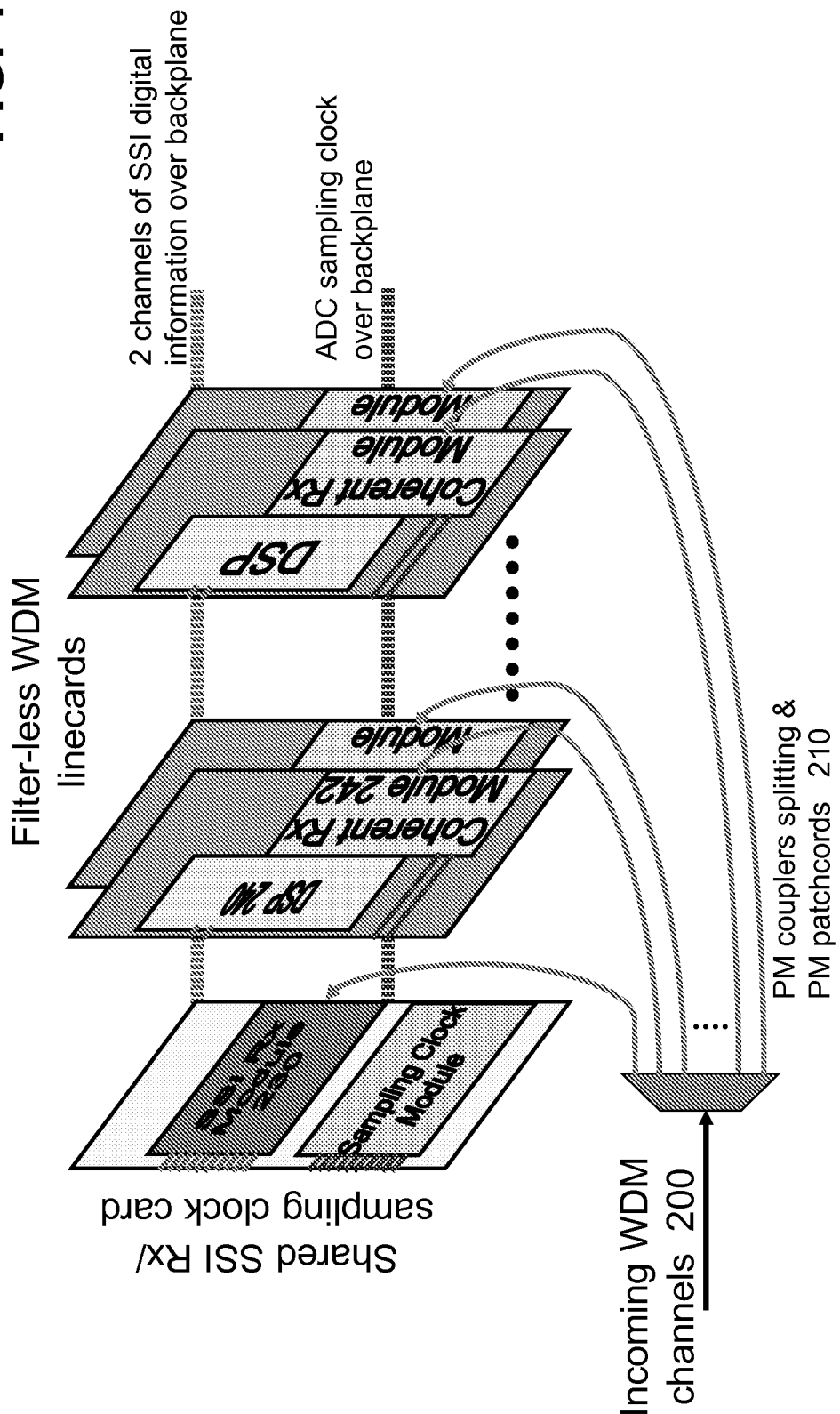
FIG. 4 shows an exemplary WDM transceiver for SSI detection sharing.

FIG. 4 shows an exemplary WDM transceiver for SSI detection sharing. Incoming WDM channels 200 are provided to PM coupler and patchcords 200 that split the channels. One of the channels is provided to a shared SSI receiving sampling clock card with an SSI module 230. The channels are also provided to a plurality of coherent receiving modules 242 that provide data to DSPs 240. The cards communicate over 2 channels of SSI digital information over the backplane, and the ADC sampling clock is also provided over the backplane.

In one embodiment, the system is used in place of a 3×3 coupler. The 3×3 coupler approach requires redesign of the standard 90-degree optical hybrid and is thus impractical for current commercial systems. For a typical polarization multiplexed optical line, 3×3 coupler approach will need 6 photodiodes and 6 ADCs for each optical line. The present system, however, uses only 4 photodiodes and 4 ADCs for each optical line with the addition of 2 photodiodes and 2 ADCs for all the optical lines. Therefore the system fares better in terms of cost when there is more than one optical line in the WDM system. The 3×3 coupler approach will require more DSP complexity because extra operations are needed to extract I and Q components from the redundant channels.

By using direct detection to obtain signal-signal beat noise in real-time, the system allows the reduction of the large signal-signal interference generated by the filter-less coherent receiver design. By adjusting weight coefficients and timing skew of the direct-detected beat-noise term, optimum cancellation of interference can be achieved in digital domain with or without the assist of balanced analog photodetection. The ADCs for both coherent and direct detection modules share the identical sampling clock source will prevent timing walk-offs during the cancellation process.

The system can use polarization maintaining components for signal distribution to the coherent detection and direct detection modules. This will make sure that the beating terms detected by both modules will have the same polarization reference after polarization beam splitting.

The system dedicates additional direct detection channels to reject signal-signal beat noise interference in the digital domain. This allows system performance to maintain at similar level (i.e. <1 dB of OSNR penalty) when number of WDM channels increases if filter-less coherent receiver is used. Since the interference term is common across all optical lines, only one direction detection module is needed for all the coherent transceivers within a WDM transponder. By sharing the direct-detected information, the system has a great advantage in terms of component cost.

What is claimed is:

1. A filter-less coherent receiving system, comprising
   a. a filter-less coherent receiver frontend;
   b. a signal-signal beat-noise detector coupled to the filter-less coherent receiver frontend; and
   c. a real-time processor coupled to the filter-less coherent receiver frontend and the signal-signal beat-noise detector to reject signal-signal interference.

2. The system of claim 1, comprising a digital signal processor (DSP) coupled to the real-time processor for data recovery.

3. The system of claim 1, wherein the filter-less coherent receiver frontend comprises a ninety degree optical hybrid coupled to a local oscillator and a polarization maintaining (PM) coupler.

4. The system of claim 3, comprising a plurality of photodiodes coupled to the ninety degree optical hybrid.

5. The system of claim 4, comprising an analog to digital converter coupled to each photodiode.

6. The system of claim 1, wherein the signal-signal beat-noise detector comprises a polarization beam splitter (PBS).

7. The system of claim 6, comprising a plurality of photodiodes coupled to the PBS and an analog to digital converter coupled to each photodiode.

8. The system of claim 1, wherein the real-time processor comprises a plurality of digital resampling blocks.

9. The system of claim 8, wherein the direct detected signal-signal beat-noise is used to cancel interference terms at the coherent receiving system output by digital signal subtraction.

10. The system of claim 8, wherein weighting coefficients and their exact timing relative to $I\_x$, $Q\_x$, $I\_y$, and $Q\_y$ are a fixed set of values adjusted during system startup calibration.

11. A method to provide digital signal-to-signal beat noise reduction in a filter-less coherent receiving system, comprising:
    a. receiving data at a filter-less coherent receiver frontend;
    b. performing signal-signal beat-noise detection; and
    c. performing real-time signal-signal interference rejection.

12. The method of claim 11, comprising rejecting signal-signal beat noise using digital signal cancellation.

13. The method of claim 11, comprising detecting signal-signal beating term.

14. The method of claim 13, comprising using PM components for optical signal routing to maintain reference as the coherent receiver.

15. The method of claim 14, comprising using a PBS to obtain signal-signal beating term on x and y polarization.

16. The method of claim 11, comprising providing dedicated channels to detect the beating term.

17. The method of claim 16, comprising using the same photodiode as a coherent receiver to match response.

18. The method of claim 16, comprising fixing a converter sampling clock as a coherent receiver to minimize timing walk-offs.

19. The method of claim 11, comprising digitally subtracting coherent receiver output and direct detection output to reject signal-signal interference.

20. The method of claim 19, comprising performing startup calibration of weighting coefficients and adjustment of timing skew to optimize performance.

21. The method of claim 11, comprising sharing signal-signal beating term among WDM channels.

22. A method to provide digital signal-to-signal beat noise reduction in a filter-less coherent receiving system, comprising:
    splitting an incoming wavelength-division multiplexing (WDM) optical signal into two paths provided as inputs to a coherent receiver and a signal-signal interference (SSI) detection receiver, wherein the optical signal has one polarization reference for the coherent receiver and the SSI detection receiver;
    digitizing four signal components of the coherent receiver;
    separating the SSI signal into separate SSI X and Y polarization with a polarization beam splitter (PBS) and digitizing the SSI X and Y polarizations; and
    performing digital SSI suppression by subtracting the SSI X and Y polarizations from the signal components received by the coherent receiver.

23. The method of claim 22, comprising adjusting weighting coefficients and timing offsets by performance feedbacks during digital signal processing.

24. The method of claim 22, comprising processing signal components for data recovery after digital SSI suppression.

* * * * *